US009183962B2

(12) United States Patent
LaCourse et al.

(10) Patent No.: US 9,183,962 B2
(45) Date of Patent: Nov. 10, 2015

(54) CERAMIC SCINTILLATOR BODY AND SCINTILLATION DEVICE

(75) Inventors: Brian C. LaCourse, Pepperell, MA (US); Anne B. Hardy, Paris (FR); Hélène Laetitia Rétot, Avignon (FR); Qiwei Chen, Shanghai (CN); Xiaofeng Peng, Shanghai (CN)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 1141 days.

(21) Appl. No.: 13/142,748

(22) PCT Filed: Dec. 24, 2009

(86) PCT No.: PCT/US2009/069533
§ 371 (c)(1),
(2), (4) Date: Sep. 27, 2011

(87) PCT Pub. No.: WO2010/078221
PCT Pub. Date: Jul. 8, 2010

(65) Prior Publication Data
US 2012/0012787 A1    Jan. 19, 2012

Related U.S. Application Data

(60) Provisional application No. 61/141,580, filed on Dec. 30, 2008.

(51) Int. Cl.
*G21K 4/00* (2006.01)
*C09K 11/77* (2006.01)
(Continued)

(52) U.S. Cl.
CPC *G21K 4/00* (2013.01); *C01G 27/00* (2013.01); *C04B 35/486* (2013.01);
(Continued)

(58) Field of Classification Search
CPC ........... C09K 11/7756; C09K 11/7769; C09K 11/7715
USPC ..................... 252/301.4 R, 301.4 F
See application file for complete search history.

(56) References Cited

U.S. PATENT DOCUMENTS 4,014,812 A * 3/1977 Kelsey et al. ........... 252/301.4 F
4,421,671 A   12/1983 Cusano et al.
(Continued)

FOREIGN PATENT DOCUMENTS

CN    1064472 A    9/1992
CN    1513943 A    7/2004
(Continued)

OTHER PUBLICATIONS

R. Babu et al., "Calorimetric measurements on rare earth pyrohafnates RE2Hf2O7 (RE=La,Eu,Gd)," Elsevier, Journal of Alloys and Compounds, 265 (1998), received in revised form Jul. 21, 1997, pp. 137-139.
(Continued)

*Primary Examiner* — Matthew E Hoban
(74) *Attorney, Agent, or Firm* — Abel Law Group, LLP; Robert N Young

(57) ABSTRACT

A scintillation device includes a ceramic scintillator body that includes a polycrystalline ceramic scintillating material comprising gadolinium. The polycrystalline ceramic scintillating material is characterized by a pyrochlore crystallographic structure. A method of producing a ceramic scintillator body includes preparing a precursor solution including a rare earth element precursor, a hafnium precursor, and an activator (Ac) precursor. The method also includes obtaining a precipitate from the solution and calcining the precipitate to produce a polycrystalline ceramic scintillating material including the rare earth element, hafnium, and the activator, and having a pyrochlore titrating the precursor solution into the precipitant solution structure.

20 Claims, 3 Drawing Sheets

(51) Int. Cl.
  *C01G 27/00* (2006.01)
  *C04B 35/486* (2006.01)
  *C04B 35/626* (2006.01)
  *C04B 35/632* (2006.01)
  *C04B 35/645* (2006.01)

(52) U.S. Cl.
  CPC ........ *C04B 35/62675* (2013.01); *C04B 35/632* (2013.01); *C04B 35/6455* (2013.01); *C09K 11/7701* (2013.01); *C09K 11/7769* (2013.01); *C01P 2002/36* (2013.01); *C01P 2002/54* (2013.01); *C01P 2004/32* (2013.01); *C01P 2004/62* (2013.01); *C04B 2235/3224* (2013.01); *C04B 2235/3225* (2013.01); *C04B 2235/3229* (2013.01); *C04B 2235/3232* (2013.01); *C04B 2235/443* (2013.01); *C04B 2235/444* (2013.01); *C04B 2235/604* (2013.01); *C04B 2235/76* (2013.01); *C04B 2235/77* (2013.01); *C04B 2235/786* (2013.01); *G21K 2004/06* (2013.01)

(56) References Cited

U.S. PATENT DOCUMENTS

| | | |
|---|---|---|
| 4,466,929 A | 8/1984 | Greskovich et al. |
| 4,473,513 A | 9/1984 | Cusano et al. |
| 4,518,545 A | 5/1985 | Cusano et al. |
| 4,518,546 A | 5/1985 | Greskovich et al. |
| 4,525,628 A | 6/1985 | DiBianca et al. |
| 4,571,312 A | 2/1986 | Greskovich et al. |
| 4,747,973 A | 5/1988 | Cusano et al. |
| 4,980,560 A | 12/1990 | Bryan et al. |
| 5,116,559 A | 5/1992 | Dole et al. |
| 5,116,560 A | 5/1992 | Dole et al. |
| 5,213,712 A | 5/1993 | Dole |
| 5,296,163 A | 3/1994 | Leppert et al. |
| 5,318,722 A | 6/1994 | Tsoukala et al. |
| 5,484,750 A | 1/1996 | Greskovich et al. |
| 5,521,387 A | 5/1996 | Riedner et al. |
| 5,562,860 A | 10/1996 | Grabmaier et al. |
| 5,640,016 A | 6/1997 | Matsuda et al. |
| 5,676,891 A | 10/1997 | Boedinger |
| 5,882,547 A | 3/1999 | Lynch et al. |
| 6,093,347 A | 7/2000 | Lynch et al. |
| 6,197,719 B1 | 3/2001 | Choudhary et al. |
| 6,323,489 B1 | 11/2001 | McClellan |
| 6,340,436 B1 | 1/2002 | Yamada et al. |
| 6,384,417 B1 | 5/2002 | Okumura et al. |
| 6,504,156 B1 | 1/2003 | Takahara et al. |
| 6,822,240 B2 | 11/2004 | Francke et al. |
| 6,967,330 B1 | 11/2005 | Lempicki et al. |
| 7,329,370 B2 | 2/2008 | Kim et al. |
| 7,531,109 B2 | 5/2009 | LaCourse et al. |
| 2001/0028700 A1 | 10/2001 | Duclos et al. |
| 2002/0013215 A1 | 1/2002 | Nakamura |
| 2002/0061416 A1* | 5/2002 | Subramanian ................ 428/633 |
| 2003/0183806 A1 | 10/2003 | Lyons |
| 2003/0193040 A1 | 10/2003 | Venkataramani et al. |
| 2005/0087724 A1 | 4/2005 | Kim et al. |
| 2007/0131908 A1 | 6/2007 | Krishna et al. |
| 2007/0292330 A1 | 12/2007 | Kurata et al. |
| 2008/0025895 A1 | 1/2008 | Hosokawa et al. |
| 2008/0128623 A1 | 6/2008 | Srivastava |
| 2008/0278823 A1* | 11/2008 | Peuchert et al. ............. 359/664 |
| 2009/0189121 A1 | 7/2009 | LaCourse et al. |
| 2012/0001074 A1 | 1/2012 | Hardy et al. |
| 2012/0049118 A1 | 3/2012 | LaCourse et al. |
| 2012/0085972 A1 | 4/2012 | LaCourse et al. |

FOREIGN PATENT DOCUMENTS

| | | |
|---|---|---|
| CN | 1587187 A | 3/2005 |
| CN | 101239822 A | 8/2008 |
| CN | 101265098 A | 9/2008 |
| CN | 101270283 A | 9/2008 |
| CN | 20081011236 A | 9/2008 |
| EP | 0166566 A2 | 1/1986 |
| EP | 0097300 B1 | 6/1988 |
| EP | 0297269 A1 | 1/1989 |
| EP | 0419847 A1 | 4/1991 |
| EP | 1028154 A1 | 8/2000 |
| JP | 59030883 A | 2/1984 |
| JP | 6438491 A | 2/1989 |
| JP | 1242456 A | 9/1989 |
| JP | 2073902 A | 3/1990 |
| JP | 2213403 A | 8/1990 |
| JP | 11029767 A | 2/1999 |
| JP | 11315278 A | 11/1999 |
| JP | 2002275465 A | 9/2002 |
| WO | 2005028591 A1 | 3/2005 |
| WO | 2005110943 A1 | 11/2005 |

OTHER PUBLICATIONS

The International Search Report and the Written Opinion for International Application No. PCT/US2009/069532 received from the International Searching Authority (ISA/KR), dated Aug. 17, 2010, 10 pages.

The International Search Report and the Written Opinion for International Application No. PCT/US2009/069533 received from the International Searching Authority (ISA/KR), dated Aug. 13, 2010, 10 pages.

The International Search Report and the Written Opinion for International Application No. PCT/US2009/069538 received from the International Searching Authority (ISA/KR), dated Jul. 30, 2010, 10 pages.

The International Search Report and the Written Opinion for International Application No. PCT/US2009/069539 received from the International Searching Authority (ISA/KR), dated Jul. 16, 2010, 8 pages.

C. Greskovich et al., "Ceramic Scintillators," Annual Reviews Inc., General Electric Corporate Research and Development, Ceramics Laboratory, Niskayuna, New York, Annu. Rev. Mater. Sci. 27, 1997, pp. 69-88.

David J. Krus et al., "Preision linear and two-dimensional scintillation crystal arrays for x-ray and gamma ray imaging applications," Bicron, a division of Saint-Gobain Industrial Ceramics, Inc., Presented at the SPIE International Synosium on Optical Science, Engineering and Instrumentation, dated Jul. 19-23, 1999, Hard X-Ray, Gamma-Ray and Neutron Detector Physics (SPIE vol. 3768), 12 pages.

C. De Mello Donega et al., "Non-Radiative Relaxation Processes of the Pr3+ Ion in Solids,"Pergamon, J. Phys. Chem. Solids vol. 56, No. 5, Elsevier Science Ltd., Received Jun. 30, 1994, Accepted Oct. 13, 1994, pp. 673-685.

Frank Schrey, "Effect of pH on the Chemical Preparation of Barium—Strontium Titanate," Journal of the American Ceramic Society, vol. 48, No. 8, Bell Telephone Laboratories, Inc., Murray Hill, New Jersey, dated Aug. 1965, 5 pages.

G.Z. Li et al., "Sol-Gel Fabrication and Photoluminescence Properties of SiO2 @ Gd2O3:Eu3+ Core-Shell Particles," Journal of Nanoscience and Nanotechnology: A Special Issue on SWCNT Growth Mechanisms, vol. 6, No. 5., <www.aspbs.coml/jnn>, American Scientific Publishers, dated May 2006, 8 pages.

H. Morkoc et al., "Large-band-gap SiC, III-V nitride, and II-Vi ZnSe-based semiconductor device technologies," American Institute of Physics, J. App. Phys. 73 (3), dated Aug. 1, 1994, downloaded Jan. 27, 2005, 36 pages.

E.A. Ivanova et al., "Synthesis of Low-Agglomerated Nanoprecursors in the ZrO2—Hf02—Y2—O3 System,"Advanced Study Center Co. Ltd., Rev.Adv.Mater.Sci. 10 (2005), Received Jun. 17, 2005, pp. 357-361.

Y.M. Ji et al., "Structure and luminescence of HfO2-codoped Gd2O3:Eu phosphors," Shanghai Institute of Ceramics, Chinese Academy of Sciences,Shanghai, PR China, Elsevier, Journal of Luminescence, 122-123 (2007), Available online Mar. 20, 2006, pp. 984-986.

(56) References Cited

OTHER PUBLICATIONS

Paul Lecoq et al., "New Inorganic Scintillation Materials Development for Medical Imaging," IEEE Transaction on Nuclear Science, vol. 49, No. 4, dated Aug. 2002. 4 pages.

L.H. Brixner, "Structural and Luminescent Properties of the Ln2Hf2O7-TYpe Rare Earth Hafnates," Mat. Res. Bull., vol. 19, No. 2, dated 1984, pp. 143-149.

V.V. Nagarkar et al., "Structured LiI Scintillator for Thermal Neutron Imaging," IEEE Transactions on Nuclear Science, vol. 48, No. 6, dated Dec. 2001, 5 pages.

V. Pelova et al., "Luminescence of Y2O3: Eu and Gd2O3: Eu Depending on Precursor and Activation Temperature," Crystal Research Technology, 33, dated 1998, 1, pp. 125-128.

Richard A. Swalin, "Thermodynamics of Solids," University of Minnesota, John Wiley & Sons, Inc., dated 1972, 5 pages.

Arhtur L. Robinson, "A Chemical Route to Advanced Ceramics," American Association for the Advancement of Science, <http://www.jstor.org/stable/1697490>, Science, New Series, vol. 233, No. 4759 (Jul. 4, 1986), Accessed Sep. 30, 2011, 4 pages.

Christopher R. Stanek et al., "Prediction of Rare-earth A2Hf2O7 Pyrochlore Phases," Communications of the American Ceramic Society, vol. 85, No. 8, Manuscript No. 187131, Presented at the 104th Annual meeting of the American Ceramic Society, dated Aug. 2002, 3 pages.

N. Teneze et al., "Cation-deficient perovskite-related compounds (Ba,La)nTin-1O3n (n=4, 5, and 6): a Rietveld refinement from neutron powder diffraction data," Pergamon, Materials Research Bulletin, 35, dated 2000, 12 pages.

Shunkichi Ueno et al., "High Temperature Water Vapor Corrosion Behavior of Titanium Aluminate (al2TiO5)," Synergy Materials Research Center, National Institute of Advanced Industrial Science and Technology, Journal of the Ceramic Society of Japan, 11 [11], dated 2003, pp. 860-862.

Yaming Ji et al., "La2Hf2O7:Ti4+ ceramic scintillator for x-ray imaging," Shanghai Institute of Ceramics, Chinese Academy of Sciences, Materials Research Society, J. Mater. Res., vol. 20, No. 3, dated Mar. 2005, 4 pages.

Ya-Ming Ji et al., "Preparation and spectroscopic properties of La2Hf2O7:Tb," SCience Direct, R&D Center of Shanghai Institute of Ceramics, Chinese Academy of Sciences, Shanghai 200050, PR of China, Elsevier, Materials Letters vol. 59, dated 2005, pp. 868-871.

Yaming Ji et al., "Fabrication of transparent La2Hf2O7 ceramics from combustion synthesized powders," R&D Center of Shanghai Institute of Ceramics, Chinese Academy of Sciences, Shanhai 200050, PR China, Elsevier, Science Direct, Materials Research Bulletin, vol. 40, dated 2005, pp. 553-559.

Lubomir Havlak, "Preparation and luminescence of Lu4Hf3O12 powder samples doped by trivalent Eu, Tb, Ce, Pr, Bi ions," Institute of Physics AS CR, Na Slovance 2, CZ-18221 Praue 8, Czech Republic, Elsevier, Optical Materials, vol. 32, dated 2010, pp. 1372-1374.

Zeli Soares Macedo et al., "Laser-Sintered Bismuth Germanate Ceramics as Scintillator Devices," Journal of the American Ceramic Society, vol. 87, No. 6, dated Jun. 2004, pp. 1076-1081.

M. Nikl, "Wide Band Gap Scintillation Materials: Progress in the Technology and Material Understanding," Institute of Physics, Academy of Sciences of the Czech Republic, Cukrovarnicka 10, CZ-162 53, Prague, Czech Republic, phys. stat. sol. (a) 178, 595, dated 2000, 26 pages.

Jiang Danyu, "The Brief Introduction of the Application of the Hafnium Compounds in Fine Ceramics," Shanghai Institute of Ceramics, Chinese Academy of Science, Shanghai 200050, China, Rare Metals Letters, vol. 26 (1), Jan. 2001, 10 pages.

* cited by examiner

CERAMIC SCINTILLATOR BODY AND SCINTILLATION DEVICE

CROSS-REFERENCE TO RELATED APPLICATIONS

The present application claims priority to PCT Application No. PCT/US09/69533, filed Dec. 24, 2009, entitled "SCINTILLATION DEVICE AND METHOD OF PRODUCING A CERAMIC SCINTILLATOR BODY," by Brian C. LaCourse et al., which in turn claims priority to U.S. Provisional Application No. 61/141,580 filed Dec. 30, 2008, entitled "SCINTILLATION DEVICE AND METHOD OF PRUDUCING A CERAMIC SCINTILLATOR BODY," by Brian C. LaCourse et al., all of which are all incorporated by reference herein in their entireties.

FIELD OF THE DISCLOSURE

The present disclosure is directed to scintillation devices, particularly ruggedized scintillation devices for industrial applications, and to methods of producing ceramic scintillator bodies.

BACKGROUND

Scintillation devices are used in a variety of industrial applications. For example, scintillation devices are used for well logging in the oil and gas industry and for imaging scans in the medical field. Typically, scintillation devices include scintillator bodies, such as a scintillator crystal, produced from a material that is effective to detect gamma rays, x-rays, ultraviolet radiation or other radiation. The scintillator bodies can absorb x-rays or other radiation and emit light. The emitted light can sometimes be recorded on film. Generally, the scintillator bodies are enclosed in casings or sleeves that include a window to permit radiation-induced scintillation light to pass out of the crystal package. The light passes to a light-sensing device such as a photomultiplier tube, a photodiode, or another photosensor that converts the light emitted from the scintillator body into electrical pulses. In other applications, multiple scintillator bodies can be used in imaging arrays for medical imaging equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems, or methods. Moreover, some statements may apply to some inventive features but not to others.

The demands of well logging and medical imaging benefit from scintillation devices that are accurate under harsh and fast conditions. Various classes of scintillating materials can be used to produce scintillator bodies depending on intended applications. For example, single crystal oxyorthosilicates, such as lutetium yttrium oxyorthosilicate (LYSO), are often used in medical imaging applications, such as positron emission tomography (PET). These materials are typically characterized by relatively high stopping power and fast decay times. Nonetheless, LYSO is often characterized by low light output, and performance in PET scan applications can suffer from electron emission resulting from the $\beta^-$ decay of lutetium.

Another class of scintillating materials includes ceramic rare earth sulfoxylates, such as gadolinium oxysulfide (GOS). Ceramic materials such as GOS can be less costly than single crystal materials, such as LYSO. However, the hexagonal structure of ceramic rare earth sulfoxylates often causes "birefringence," or light scattering at grain boundaries. As a result, such materials are less transparent and exhibit less light output or brightness than many single crystal materials. Consequently, improvements in scintillator efficiency and brightness that might be caused by the compatibility of ceramic rare earth sulfoxylates with certain activators are typically diminished by the reduced transparency that results from their hexagonal structures.

Yet another class of scintillating materials includes ceramic rare earth oxides, such as lutetium or yttrium oxides, or gadolinium lutetium oxide or gadolinium yttrium oxide. Cubic lattice structures give these materials a high degree of transparency, which increases their light output. Nonetheless, atomic distances in most ceramic rare earth oxides are shorter than ceramic rare earth sulfoxylates, for example, which causes non-radiative relaxation of some fast activators, such as cerium. Non-radiative relaxation reduces scintillator efficiency, as the activator decays without emitting visible light. Hence, the shorter atomic distances of cubic ceramic rare earth oxides tend to diminish scintillator efficiency and brightness that might result from the transparency of such materials.

Figure 1:
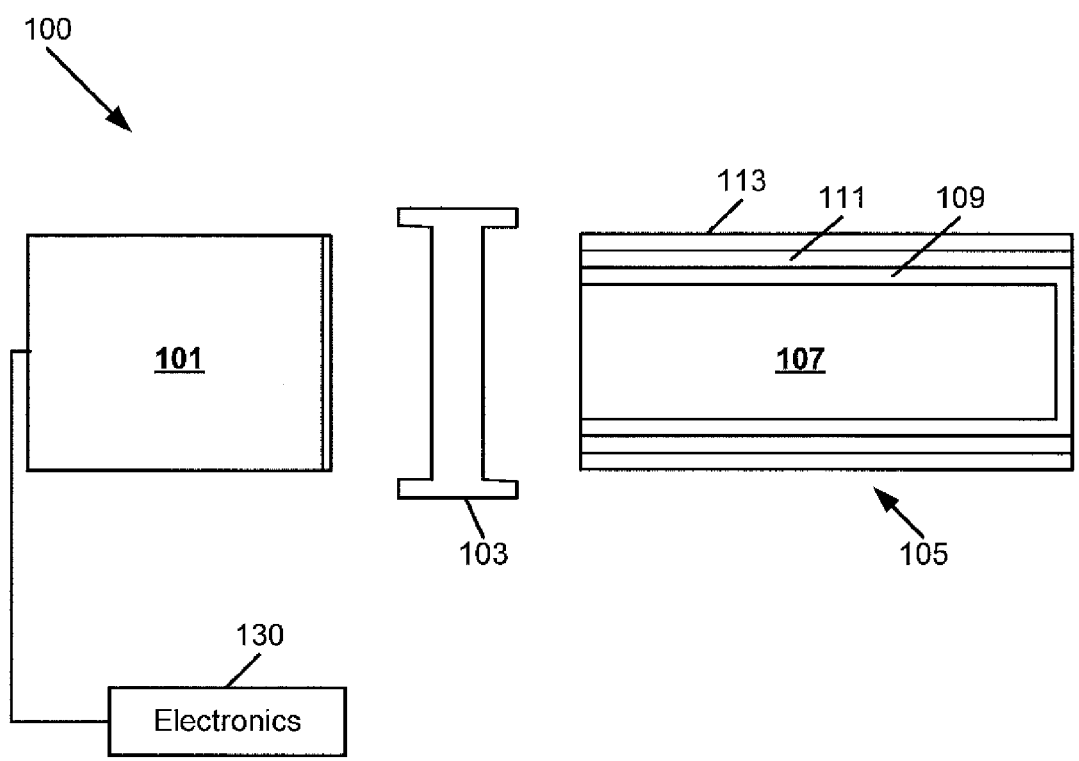
FIG. 1 is an illustration of a particular embodiment of a radiation detector device.

FIG. 1 shows a particular embodiment of a radiation detector device 100. The radiation detector device 100 includes a photosensor 101, a light pipe 103, and a scintillation device 105. Though the photosensor 101, the light pipe 103, and the scintillation device 105 are illustrated separately from each other, it is to be understood that the photosensor 101 and the scintillation device 105 are adapted to be coupled to each other via the light pipe 103.

In one embodiment, the photosensor 101 includes a device capable of spectral detection and resolution. For example, the photosensor 101 can comprise a conventional photomultiplier tube (PMT), a hybrid photodetector, or a photodiode. The photosensor 101 is adapted to receive photons emitted by the scintillation device 105 after absorbing x-rays or other radiation, and the photosensor 101 is adapted to produce electrical pulses or imaging signals from photons that it receives.

The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. In one embodiment, the light pipe 103 can include a quartz light pipe, plastic light pipe, or another light pipe. In another embodiment, the light pipe 103 can comprise a silicone rubber interface that optically couples an output window 119 of the scintillation device 105 with an input window of the photosensor 101. In some embodiments, multiple light pipes can be disposed between the photosensor 101 and the scintillation device 105.

The scintillation device 105 includes a scintillator body 107 housed within a casing 115. The scintillator body 107 can have various shapes, such as a rectangular shape, or a cylindrical surface including flat end faces. It will be appreciated that the surface finish of the scintillator body 107 can be sanded, polished, ground, etc., as desired.

The scintillator body 107 has a length that extends from a first end that is proximal to the photosensor 101 and a second end that is distal from the photosensor 101. The scintillation device 105 also includes a reflector 109 substantially surrounding the scintillator body 107. In addition, the scintillation device 105 can include a boot 111 that acts as a shock absorber to prevent damage to the scintillator body 107. The boot 111 can comprise a polymer, such as silicone rubber, another material, or a combination thereof. Further, the scintillation device 105 can also include a casing 113.

The scintillator body 107 is a ceramic scintillator body that includes a polycrystalline ceramic scintillating material containing a rare earth element. The polycrystalline ceramic scintillating material is characterized by a pyrochlore crystallographic structure and includes a chemical composition that can be represented by a general formula of $A_2X_2O_7$:Ac or $A_2X_2O_6O'$:Ac, where $A_2$ includes a rare earth element. The rare earth element can be characterized by an atomic radius greater than approximately 175 pm, such as greater than or equal to approximately 180 pm or greater than or equal to approximately 195 pm. In a particular embodiment, $A_2$ can include gadolinium. In other embodiments, $A_2$ can represent a combination of gadolinium and another rare earth element. The other rare earth element can be characterized by an atomic radius greater than approximately 175 pm, such as greater than or equal to approximately 180 pm or greater than or equal to approximately 195 pm. In addition, the scintillating material includes a quatrovalent element, represented by X, such as hafnium. For instance, the scintillator body 107 can include a rare earth hafnate (or rare earth hafnium oxide) ($A_2Hf_2O_7$), such as gadolinium hafnate $Gd_2Hf_2O_7$.

As represented in the general formula, the chemical composition of the scintillating material also includes an activator, Ac. The activator causes the scintillator body 107 to emit visible light after absorbing gamma radiation, x-rays, ultraviolet radiation, or other radiation. The activator can include a rare earth element, such as a lanthanide element. For example, the activator can include cerium, europium, praseodymium, samarium, terbium, or ytterbium. In another embodiment, the activator can include titanium. In an illustrative embodiment, the activator comprises less than or equal to approximately ten percent (10%) of the scintillating material, such as less than or equal to approximately five percent (5%) or less than or equal to approximately two percent (2%) of the scintillating material.

In an illustrative embodiment, the scintillator body 107 can be characterized by a grain size of from approximately 1 μm to approximately 100 μm. Additionally, the scintillator body 107 can also be characterized by a density of greater than 98%, such as greater than or equal to 99.9%, of theoretical density. In addition, the scintillator body 107 can be characterized by an optical transmittance of greater than fifty percent (50%) total transmission at a scintillator body thickness that stops greater than 98% of x-ray or other radiation at a wavelength of maximum emission. Moreover, the scintillator body 107 can be characterized by a decay time of less than 1 ms. The scintillator body 107 can also be characterized by a high stopping power, such as with an atomic number (eff Z) of greater than approximately 62.

Figure 2:
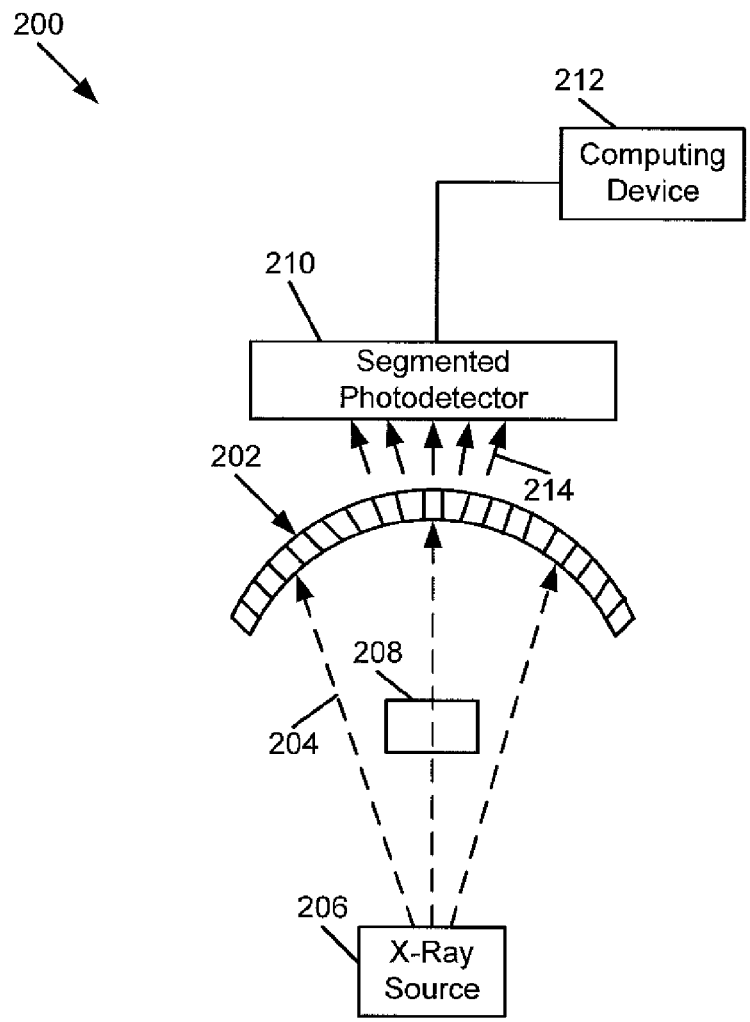
FIG. 2 is an illustration of a particular embodiment of a computed tomography (CT) device.

FIG. 2 illustrates a particular embodiment of x-ray scanning equipment 200, such as x-ray computed tomography (CT) equipment. The x-ray scanning equipment 200 includes an array 202 of scintillator devices, or pixels, and a segmented photodetector 210. The x-ray scanning equipment 200 also includes an x-ray source 206 adapted to emit x-rays 204, e.g., in a fan-shaped or cone-shaped pattern. The x-ray source 206 and the array 202 of scintillator devices may be adapted to rotate about an object 208. For example, the x-ray source 206 and the array 202 may be adapted to rotate opposite each other substantially along a circle centered about the object 208 and at substantially equal rates.

In a particular embodiment, each pixel in the array 202 includes a scintillator body. Each scintillator body is adapted to absorb x-rays 204 emitted by the x-ray source 206 and to emit scintillation light 214 that feeds into the segmented photodetector 210. The segmented photodetector 210 is adapted to measure scintillation light 214 received from each pixel and to determine from which pixel the particular scintillation light is received. The segmented photodetector 210 is adapted to produce signals based on the amount of scintillation light emitted by each pixel in the array 202 from various angles and to send the signals to the computing device 212. The computing device 212 is adapted to construct an image of the object 208 based on the signals received from the segmented photodetector 210.

Each pixel in the array 202 includes a ceramic scintillator body that comprises a polycrystalline ceramic scintillating material containing a rare earth element. The polycrystalline ceramic scintillating material is characterized by a pyrochlore crystallographic structure and includes a chemical composition that can be represented by a general formula of $A_2X_2O_7$ or $A_2X_2O_6O'$, where $A_2$ includes a rare earth element. In a particular embodiment, $A_2$ can include gadolinium. In other embodiments, $A_2$ can include a combination of gadolinium and another rare earth element. In addition, the scintillating material includes a quatrovalent element, represented by X, such as hafnium. For instance, the ceramic scintillator body can include a rare earth hafnate (or rare earth hafnium oxide) ($A_2Hf_2O_7$), such as gadolinium hafnate $Gd_2Hf_2O_7$.

As represented in the general formula, the chemical composition of the scintillating material also includes an activator, Ac. The activator can include a rare earth element, such as a lanthanide element. For example, the activator can include cerium, europium, praseodymium, samarium, terbium, or ytterbium. In another embodiment, the activator can include titanium. In an illustrative embodiment, the activator comprises less than or equal to approximately ten percent (10%) of the scintillating material, such as less than or equal to approximately five percent (5%) or less than or equal to approximately two percent (2%) of the scintillating material.

In an illustrative embodiment, each scintillator body in the array 202 can be characterized by a grain size of from approximately 1 μm to approximately 100 μm. Additionally, each scintillator body can also be characterized by a density of greater than 98%, such as greater than or equal to 99.9%, of theoretical density. In addition, each scintillator body can be characterized by an optical transmittance of greater than fifty percent (50%) total transmission at a scintillator body thickness that stops greater than 98% of x-ray or other radiation at a wavelength of maximum emission. Moreover, each scintillator body can be characterized by a decay time of less than 1 ms. Each scintillator body can also be characterized by a high stopping power, such as with an atomic number (eff Z) of greater than approximately 62.

Figure 3:
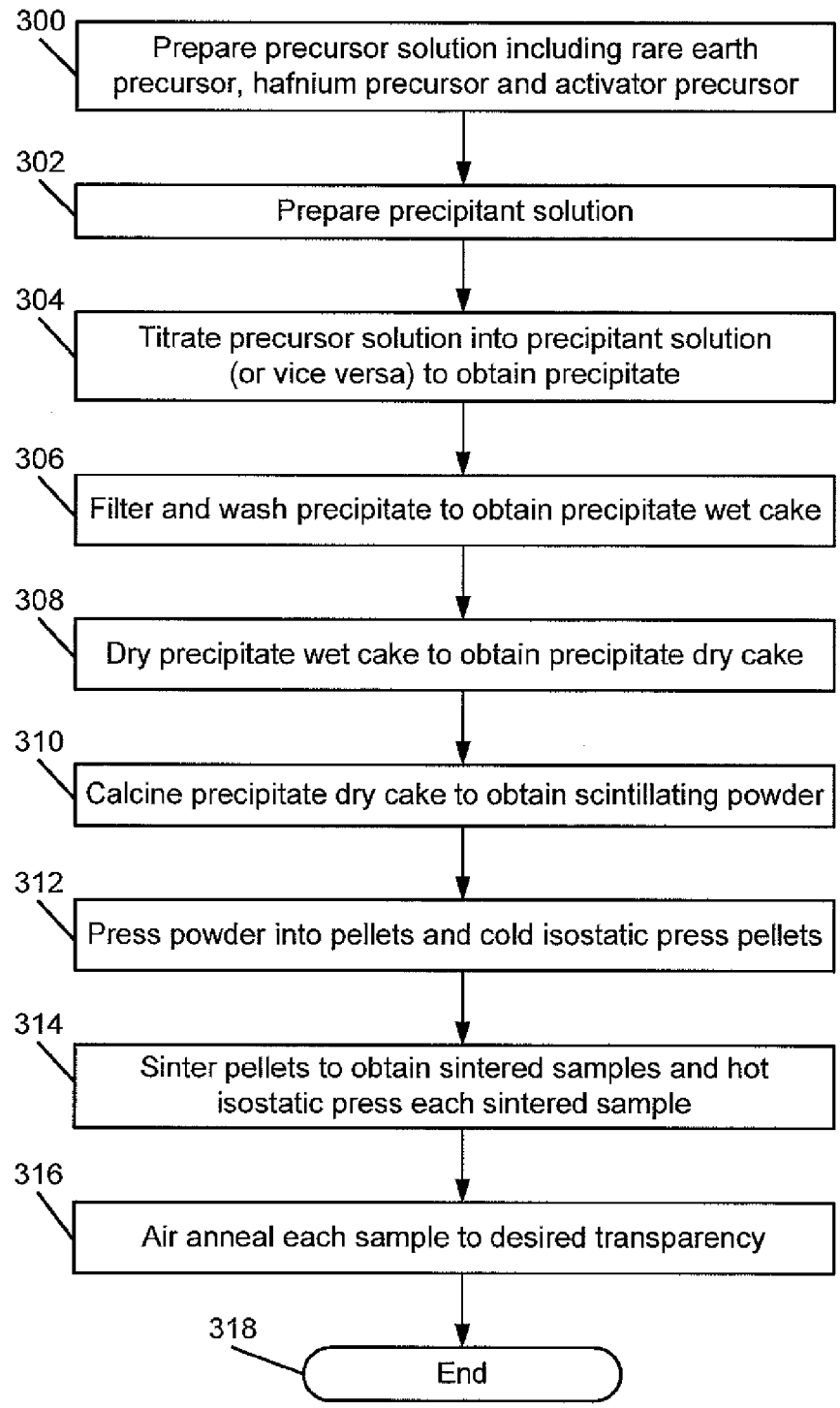
FIG. 3 is a flow diagram illustrating a particular embodiment of a method of producing a ceramic scintillator body.

FIG. 3 is a flow diagram illustrating a particular embodiment of a method of producing a ceramic scintillator body. At block 300, a precursor solution is prepared including a rare earth element precursor mixed with a hafnium precursor and an activator (Ac) precursor. In an illustrative embodiment, the rare earth element precursor comprises a gadolinium precursor, such as gadolinium nitrate or gadolinium chloride. In another illustrative embodiment, the rare earth element precursor can comprise a lanthanum precursor, such as lanthanum nitrate or lanthanum chloride. The hafnium precursor comprises hafnium chloride ($HfCl_4$), hafnium oxynitrate ($HfO(NO_3)_2$), anhydrous hafnium nitrate ($Hf(NO_3)_4$) or a combination thereof.

Moving to block 302, a precipitant solution is prepared. The precipitant solution can include ammonium hydroxide ($NH_4OH$), ammonium bicarbonate ($NH_4HCO_3$), or a combination thereof. In another embodiment, the precipitant solution can include oxalic acid ($H_2C_2O_4$). Proceeding to block 304, the precursor solution is titrated into the precipitant solution (or vice versa) to form a precipitate. Continuing to block 306, the precipitate is filtered and washed, and a precipitate wet cake is obtained. For example, the precipitate can be washed using deionized water until a desired conductivity value of residual ions is reached. In another example, the precipitate can also be washed with ethanol to prevent agglomeration during drying.

Advancing to block 308, the precipitate wet cake is dried to obtain a precipitate dry cake. At block 310, the precipitate dry cake is calcined to obtain a ceramic scintillating powder having a composition represented by the general formula $A_2Hf_2O_7$:Ac. For example, the composition can be represented by a general formula of $Gd_2Hf_2O_7$:Ti.

Moving to block 312, the calcined powder can be formed into ceramic scintillator bodies by first die pressing the powder into pellets and then cold isostatic pressing the pellets. Proceeding to block 314, the pressed pellets are sintered to obtain sintered samples, and each sintered sample is hot isostatic pressed. Advancing to block 316, in a particular embodiment, each sample is air annealed to improve transparency. The method terminates at 318.

EXAMPLE

In one example, a precipitant solution of ammonium hydroxide ($NH_4OH$) and ammonium bicarbonate ($NH_4HCO_3$) was prepared by adding 3M $NH_4OH$ and 1M $NH_4HCO_3$ to a beaker and mixing to form a uniform complex precipitant solution, diluted to approximately 500 ml. Next, a solution of precursor nitrates was prepared by mixing correct proportions of $Gd(NO_3)_3$, $HfO(NO_3)_2$, and $Ce(NO_3)_3$, diluted to 1.5 L. The precursor solution was titrated into the precipitant solution to form a precipitate. The precipitate was filtered from solution and washed with deionized water and Ethanol.

The precipitate wet cake was dried in an oven at approximately 60° C., and the dried cake was calcined at 850° C. for 2 hrs in order to form a scintillating material having a composition of $Gd_2Hf_2O_7$:Ce.

The calcined powder was formed into ceramic scintillator bodies by first die pressing the powder into approximately 12 mm diameter pellets and then cold isostatic pressing the pellets to approximately 30 ksi ($2.07 \times 10^8$ Pa). The pressed pellets were then sintered in air at between 1500° C. and 1600° C. for 3 hrs. Each sintered sample was then hot isostatic pressed at between 1400° C. and 1600° C. for 1 hr in Argon at approximately 30 ksi to produce a ceramic scintillator body.

It is found that characteristics of the powder scintillating material can affect density and transparency of the resulting scintillator body. Some prior methods aim to produce powders having a uniform distribution of extremely small particles one the order of 1-5 nm in diameter, while other prior methods mix large (e.g., greater than 500 nm) and small (1-5 nm) sizes to attempt to fill any gaps between particles. However, it is found that a powder having substantially spherical particles between 10 nm and 500 nm, with a narrow particle size distribution is advantageous. For instance, a powder scintillating material having substantially spherical particles, where at least ninety percent of the particles have a size between approximately 50 nm and approximately 250 nm, such as approximately 66 nm to approximately 220 nm, can be used to produce a scintillator body having increased density and transparency. For instance, the scintillator body can be characterized by a density of greater than 98%, such as greater than or equal to 99.9%, of theoretical density. In another example, the scintillator body can be characterized by an optical transmittance of greater than fifty percent (50%) total transmission at a scintillator body thickness that stops greater than 98% of x-ray or other radiation at a wavelength of maximum emission.

In accordance with the embodiments described herein, a scintillation device is provided that comprises a ceramic scintillator body containing a polycrystalline ceramic scintillating material that includes a rare earth element and that is characterized by a pyrochlore crystallographic structure. The pyrochlore crystallographic structure can include a first sublattice comprising a plurality of rhombohedra, where each rhombohedron includes a rare earth element A coordinated by six O and two O' atoms. The pyrochlore lattice structure also includes a second sublattice comprising a plurality of distorted octahedra, where each distorted octahedron includes a cation X coordinated with six O elements and two O vacancies. The vacancies cause corner-sharing among adjacent X atoms. The coordination environment around each O element comprises a distorted tetrahedron including two A atoms and two X atoms.

The scintillator device emits visible light in proportion to the intensity of radiation absorbed by the ceramic scintillator body. The visible light can be collected by a photosensor (e.g., a photodiode, photomultiplier tube, or other photosensor) and can be converted into electrical signals for use in measurement while drilling (MWD) applications or in medical imaging applications, such as for computed tomography (CT) or positron emission tomography (PET).

In a particular embodiment, the polycrystalline ceramic scintillating material includes a rare earth hafnate, such as gadolinium hafnate, doped with an activator that includes a second rare earth element or titanium. Typically, as the atomic radius of a rare earth element approaches that of hafnium, a rare earth hafnate will exhibit a disordered structure. As the atomic radius of the rare earth element increases, particularly above 175 pm, the rare earth hafnate structure becomes ordered but not necessarily cubic. Gadolinium hafnate exhibits a pyrochlore structure, which is more cubic than other rare earth hafnates. This more cubic structure causes gadolinium hafnate to exhibit higher degrees of transparency when used in scintillator bodies. Increased transparency allows visible light produced by the scintillator body to escape, such that it can be measured or recorded on film.

At the same time, the relatively high density of gadolinium hafnate contributes to its relatively high stopping power compared to other scintillating materials, with gadolinium hafnate exhibiting even greater stopping power than lanthanum hafnate. That is, the scintillating material is able to absorb a higher proportion of radiation, such as gamma rays or X-rays, than lower density materials. In addition, gadolinium hafnate is compatible with "fast" activators, such as cerium, neodymium, europium, terbium, titanium, and other activators, which cause fast decay of excited valence electrons that emit photons as they move from a higher energy state to a lower energy state. Fast activators are necessary in PET, CT and other applications where high numbers of individual pulses are counted despite short scan times.

Ceramic materials can be characterized by lower production costs than other scintillating materials. Nonetheless, it can be difficult to produce ceramic crystals that are sufficiently transparent to allow visible light emitted by excited valence electrons to pass from the crystal to a photosensor for measurement. This is particularly true where high-density crystals are desired. It has been found that formation of powders that contain rare earth hafnates and dopants, through co-precipitation, enables production of ceramic scintillating crystals using ceramic processes, such as sintering, hot forging, hot pressing, or other ceramic firing processes. Such ceramics exhibit good stopping power and light output.

Starting powder quality has a significant impact on final performance of polycrystalline ceramic scintillator bodies, particularly with respect to properties such as optical transmittance, afterglow, and light output. Solid state reaction and combustion methods can be used to produce scintillator bodies formed from lanthanum hafnate, for example, but both methods have drawbacks, such as control over grain size and safety issues.

It is found that a co-precipitation process provides desired chemical homogeneity of a ceramic scintillating powder material. Co-precipitation has been used with respect to $Y_2O_3$ stabilized $ZrO_2$. However, co-precipitation with respect to lanthanum hafnate, for instance, requires a strict chemical stoichiometric ratio of lanthanum oxide to hafnium oxide, and solubility product constants of precursors, such as $La(OH)_3$ and $Hf(OH)_4$ differ significantly. Hence, it is typically difficult to precipitate lanthanum and hafnium simultaneously.

It is found that titrating a precursor solution that includes, for example, lanthanum nitrate, hafnium oxynitrate and an activator precursor into a precipitant solution of ammonium hydroxide, ammonium bicarbonate, oxalic acid, oxalates, urea, or any combination thereof, yields co-precipitated lanthanum, hafnium and activator.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

According to a first aspect, a scintillation device comprises a ceramic scintillator body that includes a polycrystalline ceramic scintillating material comprising gadolinium. The polycrystalline ceramic scintillating material is characterized by a pyrochlore lattice structure. In one embodiment of the first aspect, a chemical composition of the polycrystalline ceramic scintillating material is represented by a formula of $A_2X_2O_7$:Ac, where Ac is an activator and $A_2$ includes gadolinium.

In an embodiment of the first aspect, $A_2$ includes gadolinium and another rare earth element. The other rare earth element can be characterized by an atomic radius greater than or equal to 180 pm, such as greater than or equal to 195 pm.

In another embodiment of the first aspect, X represents a quatrovalent element, such as hafnium. In this embodiment, the chemical composition can be represented by a general formula of $Gd_2Hf_2O_7$:Ac, where Ac is an activator. In one example, the activator comprises less than ten percent (10%) of the polycrystalline ceramic scintillating material based on molar percentage. The activator can include a rare earth element, such as a lanthanide element. For instance, the activator can include cerium, praseodymium, neodymium, europium, terbium, holmium, ytterbium, or any combination thereof. In another embodiment, the activator can include titanium.

According to a second aspect, a ceramic scintillator body includes a polycrystalline ceramic scintillating material that includes gadolinium. The polycrystalline ceramic scintillating material is characterized by a pyrochlore crystallographic structure. In one embodiment, the ceramic scintillator body is characterized by a density of at least 99.9% of theoretical density. Further, the ceramic scintillator body can be characterized by a grain size of from approximately 1 μm to approximately 100 μm. In one example, the polycrystalline ceramic scintillating material comprises gadolinium hafnate ($Gd_2Hf_2O_7$).

According to a third aspect, a method of producing a ceramic scintillator body includes preparing a precursor solution including a rare earth element precursor, a hafnium precursor, and an activator (Ac) precursor. The method also includes obtaining a precipitate from the solution and calcining the precipitate to produce a polycrystalline ceramic scintillating material including the rare earth element, hafnium, and the activator, and having a pyrochlore crystallographic structure. In one embodiment, the polycrystalline ceramic scintillating material is a powder.

Further, the method can include preparing a precipitant solution and titrating the precursor solution into the precipitant solution, or titrating the precipitant solution into the precursor solution, to obtain the precipitate. The precipitant solution can include, for example, ammonium hydroxide, ammonium bicarbonate, oxalic acid, or any combination thereof. Further, the hafnium precursor can include hafnium chloride ($HfCl_4$), hafnium nitrate ($Hf(NO_3)_4$), or a combination thereof.

According to a fourth aspect, a ceramic scintillating powder comprises a polycrystalline ceramic scintillating material including gadolinium, where the polycrystalline ceramic scintillating material is characterized by a pyrochlore crystallographic structure. In one embodiment of the fourth aspect, the polycrystalline ceramic scintillating material comprises a plurality of substantially spherical particles and wherein at least ninety percent of the particles are characterized by a particle size of from approximately 50 nm to approximately 250 nm. For example, at least ninety percent of the particles can be characterized by a particle size of from approximately 66 nm to approximately 220 nm.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A scintillation device comprising a ceramic scintillator body that includes a polycrystalline ceramic scintillating material having a chemical composition represented by a general formula of $A_2Hf_2O_7$:Ac, wherein Ac is an activator including cerium or neodymium, and A includes gadolinium, wherein the polycrystalline ceramic scintillating material is characterized by a pyrochlore crystallographic structure.

2. A ceramic scintillating powder comprising a polycrystalline ceramic scintillating material having a chemical composition represented by a general formula of $A_2Hf_2O_7$:Ac, wherein Ac is an activator including cerium or neodymium, and A includes gadolinium, wherein the polycrystalline ceramic scintillating material is characterized by a pyrochlore crystallographic structure.

3. The ceramic scintillating powder of claim 2, wherein the polycrystalline ceramic scintillating material comprises a plurality of substantially spherical particles and wherein at least ninety percent of the particles are characterized by a particle size of from approximately 50 nm to approximately 250 nm.

4. The ceramic scintillating powder of claim 3, wherein at least ninety percent of the particles are characterized by a particle size of from approximately 66 nm to approximately 220 nm.

5. The scintillation device of claim 1, wherein A represents gadolinium.

6. The scintillation device of claim 1, wherein $A_2$ includes gadolinium and another rare earth element.

7. The scintillation device of claim 6, wherein the other rare earth element is characterized by an atomic radius greater than or equal to 180 pm.

8. The scintillation device of claim 7, wherein the other rare earth element is characterized by an atomic radius greater than or equal to 195 pm.

9. The ceramic scintillating powder of claim 2, wherein A includes gadolinium and another rare earth element.

10. The ceramic scintillating powder of claim 2, wherein A represents gadolinium.

11. The ceramic scintillating powder of claim 2, wherein the chemical composition is represented by a formula of $Gd_2Hf_2O_7$:Ce.

12. The scintillation device of claim 1, wherein the activator comprises less than ten percent (10%) of the polycrystalline ceramic scintillating material based on molar percentage.

13. The scintillation device of claim 1, wherein the activator comprises cerium.

14. The scintillation device of claim 1, wherein the activator comprises neodymium.

15. The scintillation device of claim 1, wherein the chemical composition is represented by a formula of $Gd_2Hf_2O_7$:Ce.

16. The scintillation device of claim 1, wherein the ceramic scintillator body is characterized by a density of at least 99.9% of theoretical density.

17. The scintillation device of claim 1, wherein the ceramic scintillator body is characterized by a grain size of from approximately 1 µm to approximately 100 µm.

18. The scintillation device of claim 1, wherein the chemical composition is represented by $Gd_2Hf_2O_7$Nd.

19. A method of producing a ceramic scintillator body, the method comprising:
   preparing a precursor solution including a rare earth element precursor, a hafnium precursor, and an activator (Ac) precursor;
   obtaining a precipitate from the solution; and
   calcining the precipitate to produce a polycrystalline ceramic scintillating material having a chemical composition represented by a general formula of $A_2Hf_2O_7$:Ac and a pyrochlore crystallographic structure, wherein Ac is an activator including Ce or Nd, and A includes gadolinium.

20. The method of claim 19, further comprising:
   preparing a precipitant solution; and
   titrating the precursor solution into the precipitant solution, or titrating the precipitant solution into the precursor solution, to obtain the precipitate.

* * * * *